US007171110B1

(12) United States Patent
Wilshire

(10) Patent No.: US 7,171,110 B1
(45) Date of Patent: Jan. 30, 2007

(54) SYSTEM AND A METHOD FOR STORING AUDIO/VIDEO PROGRAMS ON A HARD DISK DRIVE FOR PRESENTATION TO A VIEWER

(75) Inventor: James C. Wilshire, Capistrano Beach, CA (US)

(73) Assignees: Keen Personal Media, Inc., Lake Forest, CA (US); Keen Personal Technologies, Inc., Lake Forest, CA (US)

( * ) Notice: Subject to any disclaimer, the term of this patent is extended or adjusted under 35 U.S.C. 154(b) by 1147 days.

(21) Appl. No.: 10/002,388

(22) Filed: Nov. 30, 2001

(51) Int. Cl.
*H04N 5/00* (2006.01)
(52) U.S. Cl. .................. 386/125; 386/83; 386/95; 386/126
(58) Field of Classification Search .......... 386/83, 386/95, 125–126
See application file for complete search history.

(56) References Cited

U.S. PATENT DOCUMENTS

| 6,397,000 | B1 * | 5/2002 | Hatanaka et al. | 386/98 |
| 6,973,258 | B1 * | 12/2005 | Yoo et al. | 386/111 |
| 2002/0031330 | A1 * | 3/2002 | Ono et al. | 386/46 |
| 2002/0168178 | A1 * | 11/2002 | Rodriguez et al. | 386/92 |
| 2003/0147391 | A1 * | 8/2003 | Fujita et al. | 370/390 |

OTHER PUBLICATIONS

Texas Instruments Data Manual, TSB42AA4/TSB42AB4 (ceLynx), Jun. 2000.

* cited by examiner

*Primary Examiner*—Thai Q. Tran
*Assistant Examiner*—Helen Shibru
(74) *Attorney, Agent, or Firm*—Howard H. Sheerin, Esq.

(57) ABSTRACT

An audio/video (A/V) system for storing A/V programs includes an interface configured to receive a transport stream structured in packets and representing a plurality of A/V programs. Each A/V program is represented by a plurality of packets and is identified by program identification data in each packet. A storage management system is connected to receive the transport stream from the interface and to detect the program identification data of each received packet. A buffer is coupled to the storage management system and has a plurality of separate buffer portions. Each buffer portion is in communication with the storage management system to receive data of packets having program identification data related to a single A/V program and to store the data of the packets separate from data of packets having program identification data related to different A/V programs. A storage medium is coupled to the storage management system and has a plurality of separate storage files for the A/V programs. Each storage file receives data of the packets having program identification data related to a single A/V program and transferred from one of the separate buffer portions of the buffer.

6 Claims, 3 Drawing Sheets

SYSTEM AND A METHOD FOR STORING AUDIO/VIDEO PROGRAMS ON A HARD DISK DRIVE FOR PRESENTATION TO A VIEWER

BACKGROUND OF THE INVENTION

1. Field of the Invention

The invention relates to a system for presenting a program to a user. More particularly, the invention relates to a method and a system for storing audio/video programs on a storage device for presentation to a viewer.

2. Description of the Related Art

An exemplary system for storing audio/video (A/V) programs is a personal video recorder, hereinafter referred to as PVR. Similar to a conventional video cassette recorder (VCR), a PVR is coupled to a monitor or a television set in a viewer's home and receives broadcast signals via a coaxial cable, a satellite dish or an antenna for terrestrial radio frequency (RF) signals. Often, a PVR is also coupled to a set top box. A PVR includes a hard disk drive with a storage capacity of between 20 GB and 80 GB that allows recording of up to 80 hours of television programming.

In order to store such large quantities of A/V programs, the A/V programs are usually compressed. That is, an encoder compresses and encodes an A/V program prior to storing, and a decoder decompresses and decodes the A/V program during playing back the A/V program. The encoder outputs a stream of program data that has a reduced bit rate and a reduced redundancy. The encoder and decoder usually operate in accordance with international standards and apply a compression process defined by the Moving Picture Expert Group (MPEG), e.g., MPEG-2, or by the International Telecommunications Union (ITU), e.g., the H.263 standard, that define uniform requirements for coding and decoding of program data.

For instance, the MPEG-2 compression of an A/V program by an MPEG-2 encoder results in a single compressed A/V program, which is referred to as "single-program elementary stream." The MPEG-2 encoder packetizes the single-program elementary stream to generate a packetized elementary stream (PES). An MPEG-2 program multiplexer multiplexes a group of packetized elementary streams, i.e., a plurality of A/V programs, into a "transport stream." The transport stream includes multiple series of fixed-size data packets and represents the plurality of A/V programs. Each data packet comprises a payload and a header that includes packet identification ("PID") values.

The PVR stores the transport stream sequentially on the hard disk drive. Likewise, during playing back of an A/V program, the PVR retrieves the transport stream sequentially from the hard disk drive. The sequential management of the transport stream requires a high bandwidth and complicates the deleting of individual A/V programs. Thus, there is a need for an improved technique for storing and retrieving A/V programs.

SUMMARY OF THE INVENTION

An aspect of a preferred embodiment involves a method of storing a plurality of audio/video (A/V) programs on a storage medium for presentation to a viewer. The method receives a transport stream structured in packets and representing a plurality of A/V programs. Each A/V program is represented by a plurality of packets and is identified by program identification data in each packet. The method detects the program identification data of each received packet and stores data of packets relating to a single A/V program in a buffer portion separate from buffer portions for data of packets having program identification data related to different A/V programs. Further, the method transfers the data of the packets from the separate buffer portions to separate storage files in a storage medium. Each storage file stores only data of the packets having program identification data related to a single A/V program.

A further aspect of a preferred embodiment involves an audio/video (A/V) system for storing A/V programs. An interface is configured to receive a transport stream structured in packets and representing a plurality of A/V programs. Each A/V program is represented by a plurality of packets and is identified by program identification data in each packet. A storage management system is connected to receive the transport stream from the interface and to detect the program identification data of each received packet. A buffer is coupled to the storage management system and has a plurality of separate buffer portions. Each buffer portion is in communication with the storage management system to receive data of packets having program identification data related to a single A/V program and to store the data of the packets separate from data of packets having program identification data related to different A/V programs. A storage medium is coupled to the storage management system and has a plurality of separate storage files for the A/V programs. Each storage file receives data of the packets having program identification data related to a single A/V program and transferred from one of the separate buffer portions of the buffer.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENT

Figure 1:
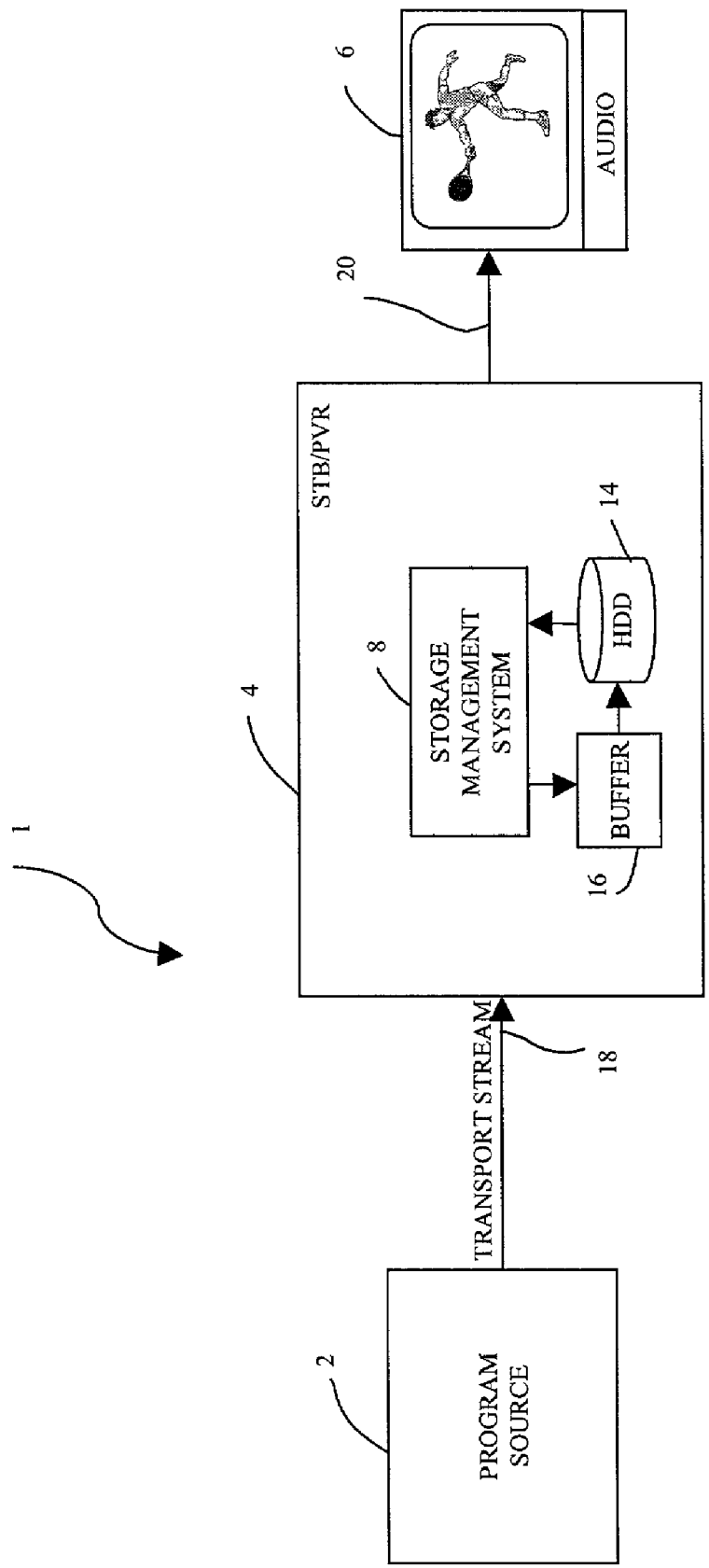
FIG. 1 shows a system for storing A/V programs in accordance with an embodiment of the present invention that includes a program source coupled to an audio/video apparatus having a storage management system, a buffer and a storage medium, wherein the storage management system provides for storing packets of a transport stream in the buffer and for transferring the packets to the storage medium.

FIG. 1 illustrates an embodiment of a system 1 for storing A/V programs in accordance with an embodiment of the present invention, which is configured to operate in accordance with the method of the present invention. The A/V programs may include various kinds of content, such as video programs (including video-on-demand and pay-per-view content), audio programs, graphics, images, text, or data. Further, the term "program" is used to refer to the various kinds of content available from, for example, from a content provider for presentation to the viewer, and may include "live" programming and locally recorded content including audio/video content and still pictures. Further, the term "watching" is hereinafter used to refer to the viewer's acts of watching, listening, reading or viewing.

The system 1 includes a program source 2 and an audio/video (A/V) apparatus 4 coupled to the program source 2 via a connection 18. The program source 2 may be located within a remote head end under control of a content provider. The content provider may be a multiple service operator ("MSO") as is known in the art. In another embodiment, the program source 2 may be a set top box located in the viewer's home and configured to receive broadcast programs from a remote head end. In yet another embodiment, the program source 2 may be a tuning device performing the functionality of a set top box within the A/V apparatus 4. The program source 2 is therefore generally considered as a "source" for A/V programs transmitted in a transport stream for processing by the A/V apparatus 4, regardless where the program source 2 is located.

The A/V apparatus 4 is coupled via a connection 20 to an audio/display device 6 that presents "live" or recorded A/V programs to the viewer. In the illustrated embodiment, the A/V apparatus 4 includes a storage medium 14 (e.g., a hard disk drive) indicated as "HDD," a buffer 16 and a storage management system 8. However, it is contemplated that the storage medium 14 is a separate device connected to the A/V apparatus 4. For example, the A/V apparatus 4 may include the program source 2 and perform the functionality of a set top box, and the storage medium 14 may be a PVR coupled to the A/V apparatus 4. Regardless of a particular embodiment, the storage management system 8, among other functions, controls the storing of packets of a transport stream on the buffer 16 and the transfer of these packets to storage files in the storage medium 14. The viewer may control the A/V apparatus 4 using a remote control.

Figure 2:
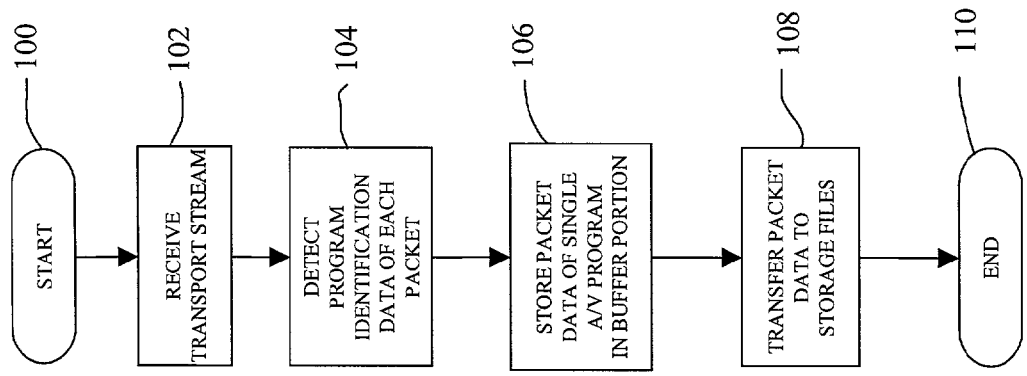
FIG. 2 is a flowchart of a procedure illustrating the method in accordance with an embodiment of the present invention that receives a transport stream structured in packets and representing a plurality of A/V programs, detects a program identification data of each received packet, stores data of packets relating to a single A/V program in a buffer portion separate from buffer portions for data of packets having program identification data related to different A/V programs, and transfers the data of the packets from the separate buffer portions to separate storage files in a storage medium.

FIG. 2 is a flowchart of a procedure illustrating the method of storing a plurality of A/V programs on the storage medium 14 for presentation to a viewer. In one embodiment, the procedure is described with reference to an A/V program that is encoded and compressed in accordance with the MPEG-2 standard and multiplexed in a transport stream. However, it is contemplated that the invention is generally applicable in connection with other MPEG standards (e.g., MPEG-4) and with systems in which the program source 2 provides the A/V programs as digital signals compressed or encoded in accordance with other compression/encoding techniques.

In a step 100, the procedure initializes the system 1 and executes routine procedures to determine whether the system 1 is operating and properly connected. The initialization procedure includes, among others, determining the available storage space (i.e., available recording time), determining the number of A/V programs the viewer has scheduled for recording, and alarming the viewer if not enough storage space is available.

In a step 102, the procedure receives a transport stream structured in packets and representing a plurality of A/V programs. Each A/V program is represented by a plurality of packets and is identified by program identification data in each packet. In one embodiment, the program source 2 provides the A/V programs as an MPEG-2 compressed transport stream. The program identification data in each packet includes a packet identification (PID value) and one or more program identifiers. Packets that represent the same A/V program have related program identification data.

In a step 104, the procedure detects the program identification data of each received packet. In one embodiment, detecting the program identification data includes filtering the transport stream at least with respect to the PID values of the packets. As a result of the filtering, packets that relate to a single A/V program advance in a separate buffer channel. For example, the storage management system 8 may have a plurality of parallel buffer channels, one for each A/V program.

In a step 106, the procedure stores data of packets relating to a single A/V program in a buffer portion separate from buffer portions for data of packets having program identification data related to different A/V programs. In one embodiment, each buffer portion of the buffer 16 is assigned to a single buffer channel and receives the data of the packets relating to a single A/V program. For example, each buffer portion buffers an MPEG-2 encoded single-program stream.

In a step 108, the procedure transfers the data of the packets from the separate buffer portions to separate storage files in the storage medium 14. Each storage file stores only data of the packets having program identification data related to a single A/V program. In one embodiment, the transfer may take place over separate buffer channels, each conveying an MPEG-2 encoded single-program stream. The procedure ends in a step 110.

Advantageously, the method facilitates the management of data representing the A/V programs on the storage medium 14. The filtering separates the A/V programs from each other so that thereafter each A/V program, or a portion thereof, can be handled individually. For example, the storage medium 14 "records" each A/V program (i.e., the data of the respective packets) in a separate storage file. The storage management system 8 retrieves from such a storage file a selected A/V program during play back. Further, the storage management system 8 can selectively delete or overwrite an A/V program in a storage file without interfering with, or even considering, other recorded A/V programs.

The method may further control retrieving the data of the packets during playing back an A/V program selected by the viewer. Once the viewer selected the A/V program, the method determines the storage file that stores the corresponding packets and reads from the storage file. While reading from the storage file, the method generates, for example, an MPEG-2 encoded single-program stream and transfers this stream to an MPEG-2 decoder that reconstructs the selected A/V program in accordance with the decoding procedure defined by the MPEG-2 standard.

It is contemplated that a single A/V program may be separated in an audio channel, a video channel and a data channel. Encoders associated with the respective channels encode the data separately and output an encoded data stream. A program multiplexer combines these data streams to the transport stream in accordance with the MPEG-2 standard. Although the A/V program is represented by separate data streams, the streams include program identifiers that identify the stream as belonging to the same A/V program.

Further, the MPEG-2 standard defines tables, such as a Program Association Table ("PAT"), a Program Map Table ("PMT") and a Conditional Access Table (CAT) if the viewer subscribes to one or more conditional access services. The PAT lists the A/V programs in the transport stream and provides the PID value where the PMT for each A/V program can be found. The PMT for each A/V program lists all video streams, audio streams and data streams for an A/V program and provides their PID values. The PID value for each PMT is provided in the PAT. The PMT may be included in the transport stream at least once every 400 milliseconds. If available, the CAT provides the PID values for conditional access information to be used by a conditional access module of the system 1.

Figure 3:
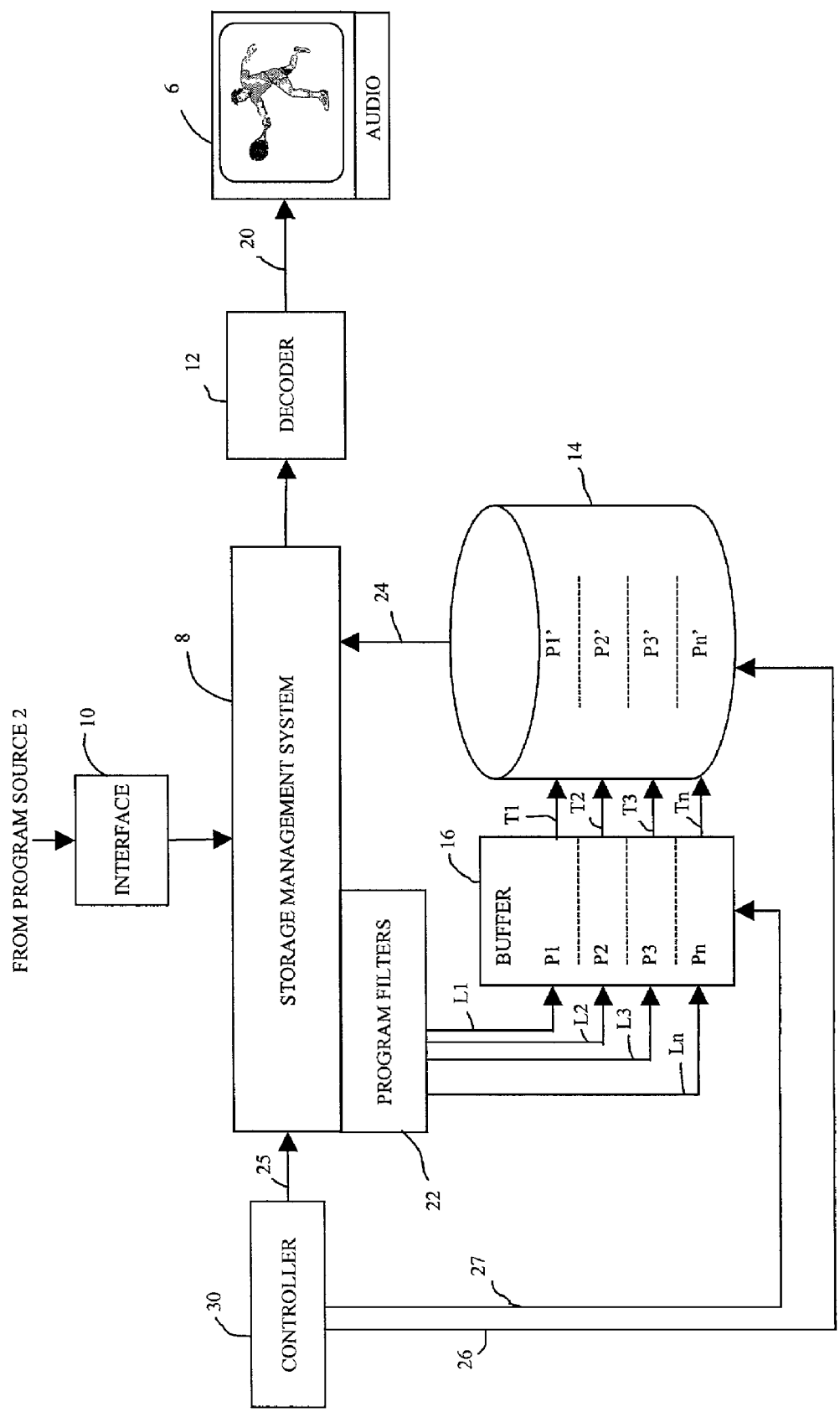
FIG. 3 shows an embodiment of the PVR of FIG. 1 with an illustration of the storing of packets for different A/V programs in different buffer portions and the transferring of the packets from the different buffer portions to different storage locations.

FIG. 3 shows an illustration of the A/V apparatus 4 shown in FIG. 1 in greater detail. In addition to the storage management system 8, the buffer 16 and the storage medium 14 shown in FIG. 1, the A/V apparatus 4 includes an interface 10, a controller 30, program filters 22 and a decoder 12. The interface 10 is connectable to the program source 2 to receive the transport stream and is coupled to the storage management system 8 to forward the transport stream to the storage management system 8. The storage management system 8 is further coupled to the controller 30, the decoder 12, the storage medium 14 and the program filters 22. The buffer 16 is interconnected between the program filters 22 and the storage medium 14.

In one embodiment, the interface 10 supports isochronous communication compatible with the IEEE 1394 standard, which is described in the "IEEE Std 1394-1995 IEEE Standard for a High Performance Serial Bus," Aug. 30, 1996, which is incorporated by reference herein. For example, the interface 10 may be a controller module TSB42AA4 available from Texas Instruments Incorporated. In one embodiment, the interface 10 receives the transport stream that is transmitted in accordance with the IEC 61883 standard for digital video broadcast (DVB).

A control bus 25 connects the controller 30 to the storage management system 8, a control bus 26 connects the controller 30 to the storage medium 14, and a control bus 27 connects the controller 30 to the buffer 16. In one embodiment, the controller 30 is a microprocessor, for example, a RISC processor. The RISC processor may be an ST20 processor that is commercially available from STMicroelectronics. The RISC processor is controlled by a real-time operating system, such as, for example, the OS/20 operating system from STMicroelectronics. Software running on the OS/20 platform, for example, is used to implement the procedure described with reference to FIG. 2.

The microprocessor is in one embodiment associated with a flash memory. As is known in the art, a flash memory is a non-volatile storage device similar to an EEPROM, but where erasing is done in blocks or the entire chip. The flash memory may have a storage capacity of 256 MB.

The controller 30 controls the operation of the A/V apparatus 4 including the storage management system 8. For example, the controller 30 processes real-time commands that the viewer inputs via a remote control to record or to play back an A/V program, or to record an A/V program while watching a recorded A/V program. The controller 30 also processes stored commands, for example, to record one or more A/V programs at a predetermined day and time. Accordingly, the controller 30 controls the storage management system 8 to store data on the storage medium 14 or to retrieve data from the storage medium 14.

Under control of the controller 30, the storage management system 8 processes the incoming transport stream. The transport stream includes packets representing a plurality of A/V programs. The plurality of A/V programs may include a subgroup of available A/V programs. For example, the subgroup may include those A/V programs offered by the services to which the viewer subscribes (e.g., basic cable service with or without premium channels), or those A/V programs selected by the viewer via the program source 2 located, for example, in a set top box. The storage management module 8 thus receives selected A/V programs for recording and deferred playing back.

The program filters 22 receive the transport stream from the storage management system 8. Although FIG. 3 shows the program filters 22 as devices external to the storage management system 8, it is contemplated that in another embodiment, the program filters 22 may be implemented within the storage management system 8. The program filters 22 include multiple PID filters, each PID filter having an assigned predetermined PID value. A particular PID filter is configured to extract only those packets from the transport stream that belong to the same program stream of a particular A/V program. Those packets that belong to different program streams and, thus, different A/V programs, have different PID values and are not selected by the particular PID filter.

Each packet includes 188 bytes, wherein the first four bytes are reserved for a packet header and wherein the remaining bytes are reserved for payload (e.g., video and audio data.) The packet header includes a field for the packet identification (PID) value. In one embodiment, each PID filter of the program filters 22 evaluates the packet headers to determine if the PID value of the packet header matches the assigned PID value. In case of a match, the PID filter selects the packet and outputs the selected packet to a buffer channel. The series of packets selected by a PID filter forms a single-program stream.

As shown in FIG. 3, buffer channels L1, L2, L3, Ln connect the program filters 22 and the buffer 16. The buffer channel L1 forwards the packets selected by a first PID filter to a first buffer portion P1 for a first A/V program. The buffer channel L2 forwards the packets selected by a second PID filter to a second buffer portion P2 for a second A/V program. The buffer channel L3 forwards the packets selected by a third PID filter to a third buffer portion P3 for a third A/V program. The buffer channel Ln forwards the packets selected by an $n^{th}$ PID filter to an $n^{th}$ buffer portion Pn for an $n^{th}$ A/V program.

In one embodiment, the buffer 16 is a synchronous dynamic random access memory (SDRAM) having a storage capacity of 4 Mbytes. As known in the art, DRAM bit cells are arranged on a chip in a grid of rows and columns where the number of rows and columns are usually a power of two. For example, a one megabit device would then have 1024×1024 memory cells. A single memory cell can be selected by a 10-bit row address and a 10-bit column address. To access a memory cell, one entire row of cells is selected and its contents are transferred into an on-chip buffer.

The storage medium 14 may be a conventional hard disk for audio/video data applications and may be associated with an IDE control equipment (not shown). The control equipment formats the storage medium 14, defines a plurality of storage files and addresses the storage files to read from and write to these storage files. It is contemplated that the storage files are files that are allocated to the same program identification data that represent a single A/V program. The program identification data may be a group of different identifiers, for example, identifying the audio, video or and data channels of the same A/V program.

As indicated in FIG. 3, multiple transfer channels T1, T2, T3, Tn, which may be part of a parallel data bus, transfer the packets from the buffer portions P1, P2, P3, Pn to respective storage files P1', P2', P3', Pn' of the storage medium 14. During playing back of a selected A/V program, the storage medium 14 reads from a corresponding storage file and outputs a single-program stream to a data bus 24 connected to the storage management system 8. The storage management system 8 forwards the single-program stream to the decoder 12.

The storage medium 14 has a storage capacity of between 20 GB and 80 GB to selectively store and, thus, record digital information such as sequences of streaming video data received from the buffer 16. That is, the storage medium 14 may store up to 80 hours of compressed video and audio data. In one embodiment, the compression is achieved by using MPEG-2, or MPEG-4. The recorded streaming video data is then available for later reproduction when the viewer decides to watch the recorded streaming video data.

The decoder 12 reconstructs the single-program stream in accordance with the MPEG-2 standard so that the A/V program can be displayed on the audio/display device 6. A display generator (not shown), either within the decoder 12 or interconnected between the decoder 12 and the audio/display device, receives the decompressed data that represents the A/V program. The display generator processes the received data and generates a displayable image. The display generator "builds" the image in accordance with conventional techniques and converts this image into a signal format that can be displayed on the audio/display device 6. For example, the signal format may be in accordance with known video/television formats such as NTSC, PAL, S-Video, RGB or the like. The display generator outputs the generated signal to the connection 20, which is connected to the audio/display device 6.

The audio/video device 6 is configured to present multimedia content to the user. The audio/video device 6 may be a TV, a computer monitor or any other display for displaying video and TV programs, text, images, or combinations thereof. Further, the audio/video device 6 may include an audio system for presenting audio programs to the user.

Those skilled in the art will appreciate that, although FIGS. 1 and 3 show the various elements of the system 1 as individual components, the functionalities of at least some of these elements may be implemented within a single element or module, such as an ASIC. Further, those skilled in the art will appreciate that at least some functionalities may be implemented in hardware, software, firmware or combinations thereof. For example, the detecting and identification of the program identification data may be performed through software.

In one embodiment, the A/V apparatus 4 may include the program source 2 and have the functionality of a set top box. As is known in the art, the functions of a set top box include, among others, tuning to a certain broadcast channel, and processing and formatting a selected broadcast program for display on the audio/display device 6. Further details of a set top box are disclosed in copending U.S. patent application Ser. No. 09/605,623, filed on Jun. 28, 2000 and entitled "Set-Top Box Connectable To A Digital Video Recorder Via An Auxiliary Interface And Selects Between A Recorded Video Signal Received From The Digital Video Recorder And A Real-Time Video Signal To Provide Video Data Stream To A Display Device," the whole content of which is incorporated by reference herein.

The system 1 and the A/V apparatus 4 have been described herein with reference to FIGS. 1–3 providing for a full understanding of the claimed subject matter. However, it is contemplated that the system 1 and the A/V apparatus 4 perform conventional functions as well. For example, the A/V apparatus 4 may present an electronic program guide (EPG) as a menu on the audio/display device 6 from which the viewer may select an A/V program for watching as a "live" program or for recording. If the user decides to record a program, the A/V apparatus 4 records the selected program immediately upon viewer input or later and automatically at a scheduled day and time. Details of an exemplary personal video recorder are disclosed in copending U.S. patent application Ser. No. 09/585,249, filed on May 31, 2000 and entitled "Digital Video Recorder Connectable To An Auxiliary Interface Of A Set-Top Box That Provides Video Data Stream To A Display Device Based On Selection Between Recorded Video Signal Received From The Digital Video Recorder And A Real-Time Video Signal," the whole content of which is incorporated by reference herein.

It is contemplated that the A/V apparatus 4 is one example of an audio/video-capable apparatus in which the present invention is implemented. In another embodiment, the present invention may be implemented in a personal computer coupled to a monitor. It is further contemplated that an audio/video-capable apparatus may be generally used to either present video content, audio content or both to a user.

What is claimed is:

1. An audio/video (A/V) system for storing A/V programs, comprising:

an interface configured to receive a transport stream structured in packets and representing a plurality of A/V programs, each A/V program represented by a plurality of packets and identified by program identification data in each packet;

a storage management system connected to receive the transport stream from the interface and to detect the program identification data of each received packet, wherein the storage management system includes a plurality of filters, each filter assigned to a buffer channel and configured to detect data comprised in packets having program identification data related to a single A/V program, each buffer channel connecting the filter to one of the buffer portions;

a buffer coupled to the storage management system and having a plurality of separate buffer portions, each buffer portion being in communication with the storage management system to receive data of packets having program identification data related to a single A/V program within the transport stream and to store the data of the packets separate from data of packets having program identification data related to different A/V programs within the transport stream; and a storage medium coupled to the storage management system and having a plurality of separate storage files for the A/V programs, each storage file receiving data of the packets having program identification data related to a single A/V program and transferred from one of the separate buffer portions of the buffer.

2. The system of claim 1, wherein the A/V program includes at least one of a video program, an audio program and data content.

3. The system of claim 1, wherein the interface is configured to operate in accordance with the IEEE-1394 specification.

4. The system of claim 1, wherein the storage medium is a hard disk drive.

5. The system of claim 4, wherein the storage management system controls the hard disk drive to selectively overwrite or delete one or more storage files.

6. An audio/video (A/V) system for storing A/V programs, comprising:
   an interface configured to receive a transport stream structured in packets and representing a plurality of A/V programs, each A/V program represented by a plurality of packets and identified by program identification data in each packet;
   a storage management system connected to receive the transport stream from the interface and to detect the program identification data of each received packet, wherein the storage management system includes a plurality of filters, each filter assigned to a buffer channel and configured to detect data comprised in packets having program identification data related to a single A/V program, each buffer channel connecting the filter to one of the buffer portions;
   a buffer coupled to the storage management system and having a plurality of separate buffer portions, each buffer portion being in communication with the storage management system to receive data of packets having program identification data related to a single A/V program and to store the data of the packets separate from data of packets having program identification data related to different A/V programs; and
   a storage medium coupled to the storage management system and having a plurality of separate storage files for the A/V programs, each storage file receiving data of the packets having program identification data related to a single A/V program and transferred from one of the separate buffer portions of the buffer.

* * * * *